(12) United States Patent
Bystedt et al.

(10) Patent No.: US 7,059,279 B2
(45) Date of Patent: Jun. 13, 2006

(54) SYSTEM FOR SUPPLY OF COMPRESSED AIR AND VEHICLE INCLUDING A SYSTEM FOR SUPPLY OF COMPRESSED AIR

(75) Inventors: Sören Bystedt, Göteborg (SE); Mats Sabelström, Billdal (SE)

(73) Assignee: Volvo Lastvagnar AB, Göteborg (SE)

( * ) Notice: Subject to any disclaimer, the term of this patent is extended or adjusted under 35 U.S.C. 154(b) by 48 days.

(21) Appl. No.: 10/707,334

(22) Filed: Dec. 5, 2003

(65) Prior Publication Data
US 2004/0163613 A1 Aug. 26, 2004

Related U.S. Application Data

(63) Continuation of application No. PCT/SE02/01078, filed on Jun. 4, 2002.

(30) Foreign Application Priority Data
Jun. 5, 2001 (SE) .................... 0101947

(51) Int. Cl.
*F01P 1/06* (2006.01)
(52) U.S. Cl. .................. 123/41.31; 417/243

(58) Field of Classification Search ............. 123/41.12, 123/41.31; 417/243
See application file for complete search history.

(56) References Cited

U.S. PATENT DOCUMENTS

| 5,386,873 A | * | 2/1995 | Harden et al. ............... 417/243 |
| 6,036,449 A | | 3/2000 | Nishar et al. ................ 471/292 |
| 6,068,447 A | * | 5/2000 | Foege .......................... 417/12 |

FOREIGN PATENT DOCUMENTS

| DE | 19911741 A1 | | 9/2000 |
| JP | 56038516 A | * | 4/1981 |
| SE | 512802 C2 | | 5/2000 |

* cited by examiner

*Primary Examiner*—Noah P. Kamen
(74) *Attorney, Agent, or Firm*—Novak Druce & Quigg, LLP

(57) ABSTRACT

A compressed air supply system including a compressor (12), a compressed air line (4) that connects an outlet (3) from the said compressor to an inlet (5) to a first active component (6), and an adjustable fan (13) which is controlled by a control unit and is arranged to generate an air flow intended to cool the said compressed air line (4), and a vehicle comprising such a system.

15 Claims, 7 Drawing Sheets

SYSTEM FOR SUPPLY OF COMPRESSED AIR AND VEHICLE INCLUDING A SYSTEM FOR SUPPLY OF COMPRESSED AIR

CROSS REFERENCE TO RELATED APPLICATIONS

The present application is a continuation patent application of International Application No. PCT/SE02/01078 filed 4 Jun. 2002 now abandoned which was published in English pursuant to Article 21(2) of the Patent Cooperation Treaty, and which claims priority to Swedish Application No. 0101947-0 filed Jun. 5, 2001. Both applications are expressly incorporated herein by reference in their entireties.

BACKGROUND OF INVENTION

1. Technical Field

The present invention relates to a compressed air supply system and a vehicle comprising (including, but not limited to) such a compressed air supply system. The invention relates more particularly to a compressed air supply system comprising an adjustable fan, which is arranged to generate an air flow for cooling compressed air generated by the compressor should the temperature of the compressed air be deemed to be too high.

2. Background

Compressed air supply systems generally comprise a compressor, compressed air lines, one or more active components and one or more compressed air tanks, which are fed by the compressor. When the compressor compresses the air, the air is heated. If high pressures are to be obtained, the compressed air attains a high temperature, which in a normal compressed air system on a heavy truck with a system pressure of 13 bar can reach approximately 300° C. A temperature of this order of magnitude is harmful to components forming part of the pneumatic system, such as seals of polymer material, for example.

Hot air furthermore absorbs a greater quantity of water than cold air, so that the load on air dryers connected to the compressed air supply system increases if the incoming air has a high temperature. In addition, the drying agent in the air dryers has a lower efficiency at high temperatures.

In order to ensure efficient functioning, the air on entry to the air dryer should preferably have a temperature of less than 60° C. This can be achieved by fitting a first component at a sufficiently large distance from the compressor, so that efficient cooling is obtained. This solution has the disadvantage, however, that it is difficult to design the piping with a continuous fall in the case of a long piping. This means that the pipe must be bent, thereby creating pockets in which water can accumulate, with a resultant risk of ice plugs forming in cold weather.

In order to reduce the risk of ice plugs occurring, vehicles have been provided with a pneumatic system comprising a short and continuously falling piping up to a first component in the form of an air dryer. In order to ensure that components of the air dryer are not damaged by excessively hot air, the air line has been fitted so that it passes by the air flow from the cooling fan that forms part of the vehicle cooling system. This fan is controlled independently of the cooling requirement of the compressed air, which leads to a risk of overheated air reaching the air dryer.

SUMMARY OF INVENTION

An object of the present invention is to provide a compressed air supply system in which the risk of a first component being exposed to air that is at too high of a temperature is reduced; while at the same time the risk of ice plugs forming in the air line is reduced. In an exemplary embodiment, a compressed air supply system is provided that comprises a fan adjustable by a control unit, in which the control unit is arranged to determine the cooling requirement of the compressed air delivered by the compressor and to generate an activation signal for the adjustable fan when a cooling requirement exists. In this manner, the first active component is protected against thermal overload resulting from compressed air fed in from the compressor, and ensures that the compressed air has a temperature within a desirable range when it reaches the first component.

BRIEF DESCRIPTION OF DRAWINGS

The invention will be described in more detail below with reference to drawings attached, in which.

DETAILED DESCRIPTION

Figure 1:
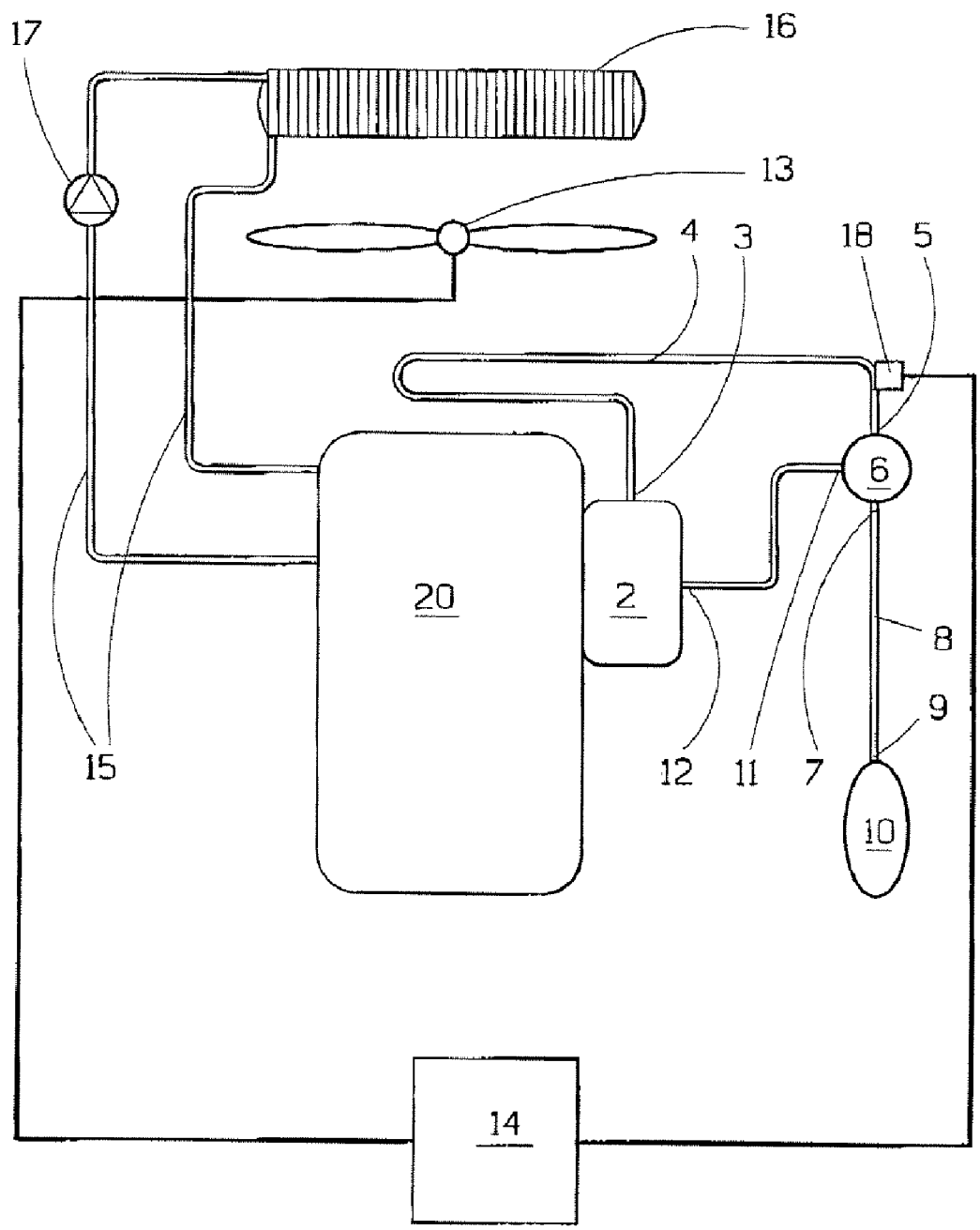
FIG. 1 shows a diagram of a system for cooling compressed air through fan control according to a first embodiment of the invention.

FIG. 1 shows a diagram of a compressed air supply system. The system comprises a compressor 2, which is of conventional type and will therefore not be described in greater detail. The compressor 2 has an outlet port 3, to which a compressed air line 4 is coupled. The compressed air line connects the outlet port to an inlet port 5 of a first active component 6. The first active component 6 preferably consists of an air dryer. The air dryer 6 furthermore has a first outlet port 7, to which a second compressed air line 8 is connected. The second compressed air line 8 connects the air dryer 6 with an inlet port 9 to a pressurized tank 10. The pressurized tank 10 accordingly supplies a number of air consumers (not shown). In an alternative embodiment, the first active component consists of the first active component of a circuit dividing valve, which divides the pneumatic system into two or more separate circuits. The compressed air supply system may also comprise more than one pressurized tank. In the exemplary embodiment shown, the air dryer 6 also has a second outlet port 11 that is connected, by way of a third compressed air line 12, to the relief mechanism of the compressor and serves to deliver a pneumatic control signal to the relief mechanism.

The compressed air supply system also has an adjustable fan 13. The fan is controlled by a control unit 14. The control for the fan 13 is designed so that the fan 13 can at least be switched on and off; alternatively the control may be designed so that the fan can be speed-controlled. According to one embodiment of the invention, the fan 13 is driven by a speed-controlled electric motor, but it may also be mechanically coupled via a variable transmission to some other type of motor, such as an internal combustion engine 20. The variable transmission may be arranged in a way that will be familiar to the person skilled in the art, for example the speed control can be achieved by way of a viscous drive coupling, which connects a power outlet from the engine 20 to the rotary shaft of the fan 13.

In the embodiment shown, the fan 13 consist of an adjustable fan which forms part of the cooling system of the internal combustion engine 20. The cooling system comprises a number of cooling ducts (not shown) arranged inside the internal combustion engine, inlet and outlet ducts 15 which carry the coolant from the internal combustion engine 20 to a radiator 16. The cooling system usually also comprises a pump 17 fitted in an inlet duct. The fan 13 is preferably fitted downstream of the radiator 16, which means that if the system is fitted on a vehicle, the air stream gives a good cooling effect on the radiator 16.

The compressed air line 4, which connects the compressor 2 to the first active component 6, is located so that it runs past the air flow generated by the fan 13. This means that the fan is able to cool the compressed air that has been heated by the compressor before the air reaches the first active component 6. The compressed air line 4 is preferably oriented so that it has a continuously falling path between the outlet port 3 of the compressor and the inlet port 5 of the first active component. This means that there are no pockets in which the water can collect and the formation of ice plugs in cold weather is thereby avoided. In the present context, the terminology of continuously falling path should be understood to mean that when fitted on a plane underlying surface the perpendicular distance between the plane underlying surface and the line diminishes along the path from the outlet port 3 to the inlet port 5.

The control unit 14 is furthermore arranged to determine the cooling requirement of the compressed air delivered by the compressor 2 and to generate an activation signal for the adjustable fan 13 when a cooling requirement exists so that the first active component is protected against thermal overload resulting from compressed air fed in from the compressor.

According to a first embodiment of the invention, a temperature probe 18 is fitted in connection with the compressed air line 4 for measuring the temperature of the compressed air delivered by the compressor 2. The temperature probe 18 has a signal connection to the control unit 14. In the control unit, a comparison is performed between the measured temperature and a temperature limit. If the temperature exceeds this limit, the control unit generates a signal to activate the fan; or if the fan is speed-controlled, a signal to increase the speed of the fan 13.

In a second embodiment of the invention, the cooling requirement of the airline is estimated from information on the working condition of the compressor 2. Variants of this second embodiment will be described below in connection with FIGS. 2 to 5. Information is contained on whether or not the compressor is active; the term active signifying that the compressor is supplying the pneumatic system with air. Use is also made of information on the working speed of the compressor since the temperature of the compressed air rises with increased compressor speed.

The compressor 2 is therefore arranged on the one hand to work in an active operating mode when the compressor supplies the pneumatic system with compressed air, and on the other to be relieved or inactive when the compressor is not supplying the system. This can be achieved in a number of ways familiar to the person skilled in the art. According to one embodiment, a valve can be opened between cylinder chambers situated in the compressor so that the volumetric efficiency of the compressor is reduced and the compressor in this condition is incapable of generating compressed air at a pressure in excess of the system pressure. According to another embodiment, a valve is opened which connects cylinder chambers of the compressor to the surrounding atmosphere. A third possibility is to drive the compressor by way of a disengageable transmission.

Figure 2:
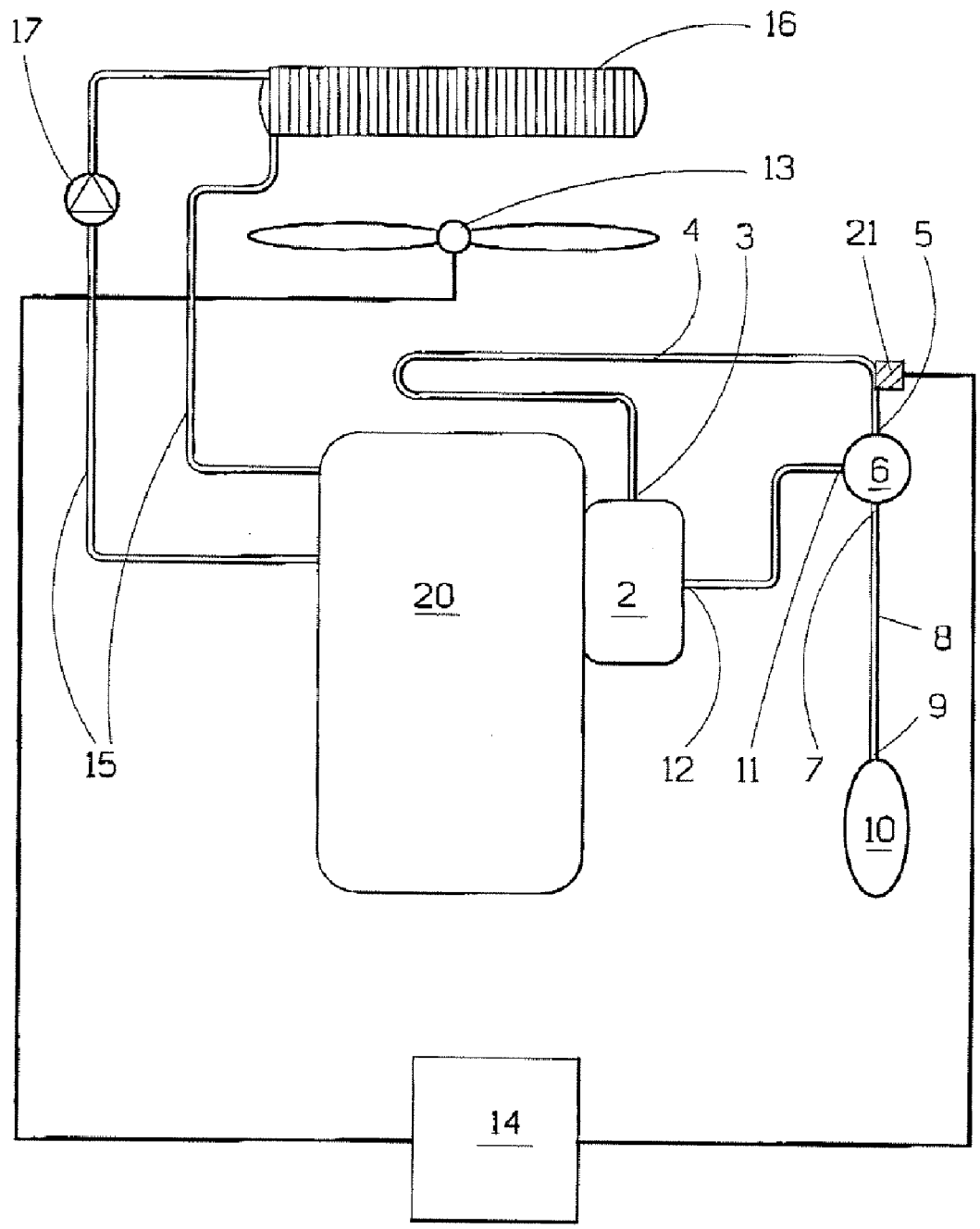
FIG. 2 shows a diagram of a system for cooling compressed air through fan control according to a first variant of the invention.

FIG. 2 shows a diagram of a first variant of the second embodiment. According to this variant, information on whether or not the compressor is working is obtained through a pressure sensor 21, which is fitted downstream of the compressor 2 and upstream of pressurized tanks 10 forming part of the pneumatic system. The pressure sensor 2 measures the pressure, the control unit 14 determining whether the pressure exceeds a limit. If the limit is exceeded, the control unit 14 registers the fact that the compressor 2 is working. Otherwise the control unit 14 determines that the compressor 2 is inactive. This is preferably designed so that a special position in the control unit is displayed on or off in a way that will be familiar to the person skilled in the art.

Figure 3:
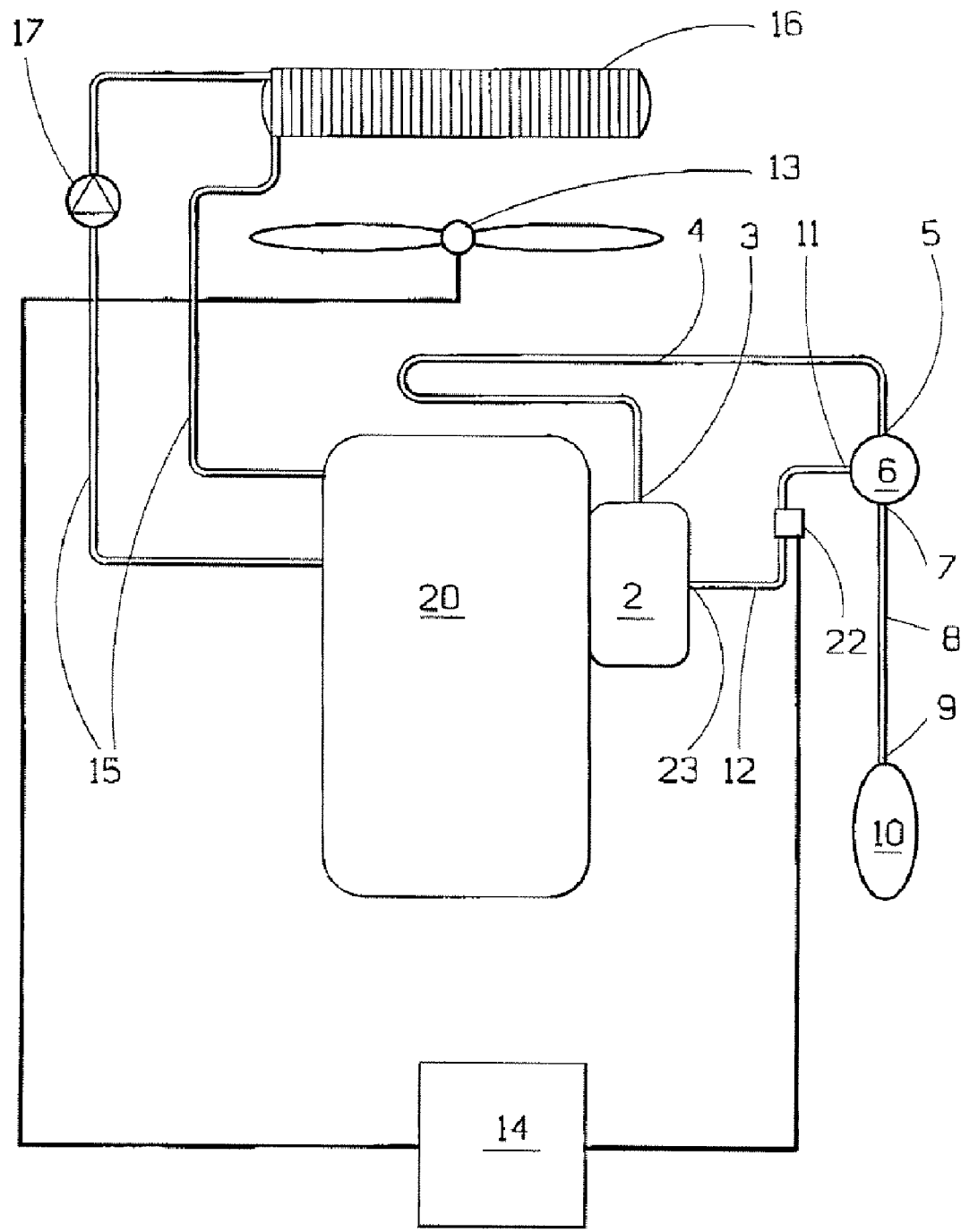
FIG. 3 shows a diagram of a system for cooling compressed air through fan control according to a second variant of the invention.

A second variant of the second embodiment of the invention is shown in FIG. 3. According to this embodiment, the compressor is driven by a power outlet (output) of an internal combustion engine 14. In order to avoid the compressor placing a load on the internal combustion engine 14 when the pneumatic system has full compressed air tanks, the compressor 2 has a pneumatically controlled relief mechanism that stops the compressor pumping air to the pneumatic system when the system has full compressed air tanks 10. The pneumatically controlled relief mechanism is controlled by way of the third compressed air line 12 which detects the pressure in the dryer 6. According to the second variant, the pneumatic control signal is registered via a pressure sensor 22, preferably located downstream of the second outlet port 11 of the air dryer 6 and upstream of the inlet port 23 of the compressor for the third air line 12. The compressed air supply system comprises a control circuit (not shown) in the air dryer, which by way of the third compressed air line generates a pneumatic control signal to a relief arrangement forming part of the compressor, the compressor 2 being arranged to be activated and deactivated as a function of an air supply requirement.

Figure 4:
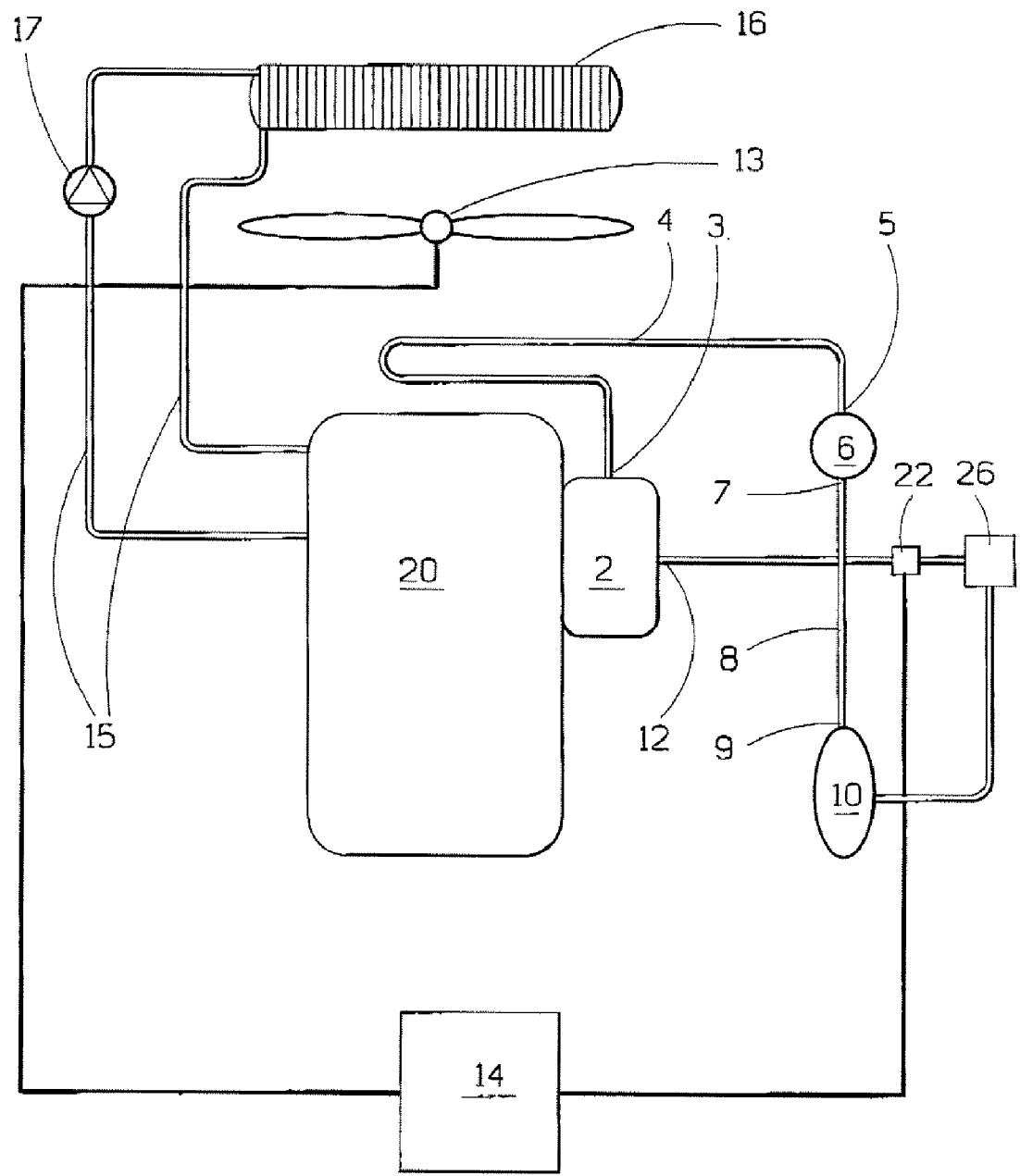
FIG. 4 shows a diagram of a system for cooling compressed air through fan control according to a third variant of the invention.

According to a third variant of the second embodiment of the invention, the compressor relief mechanism is controlled by a control unit 26 separate from the air dryer; that is to say, a governor or regulator which pneumatically registers the pressure in the pneumatic system. According to this variant, which is shown in FIG. 4, the control unit determines that the compressor is working by registering the pneumatic control signal to the compressor 2 via the pressure sensor 22, in the same way as in the previous variant.

Figure 5:
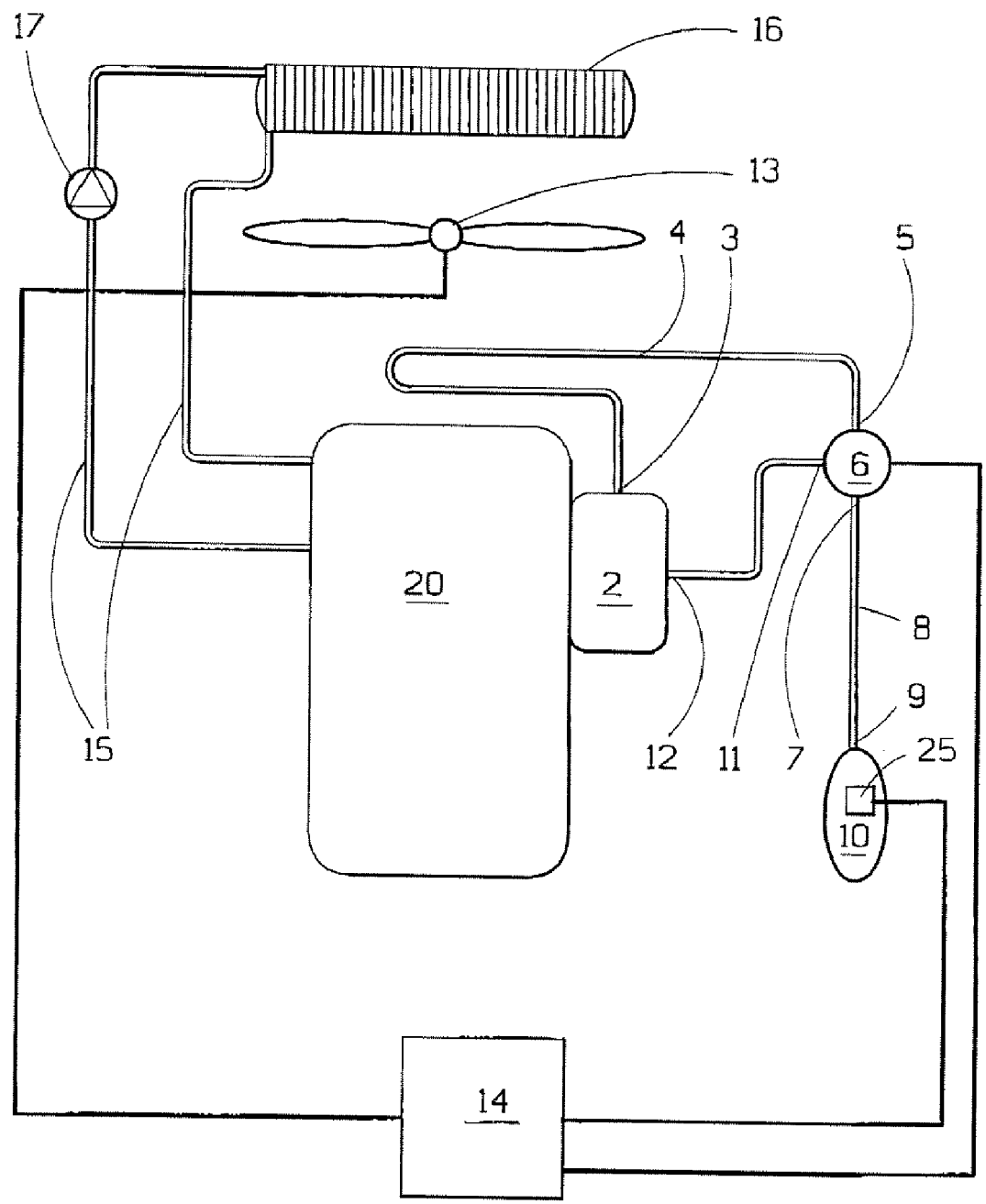
FIG. 5 shows a diagram of a system for cooling compressed air through fan control according to a fourth variant of the invention.

According to a fourth variant of the second embodiment of the invention, which is shown in FIG. 5, the control unit 14 determines that the compressor 2 is working in that a pressure sensor 25, which is fitted in connection with the pressurized tank or pressurized tanks 10, registers the pressure in the pressurized tank 10. If the pressure is too low, the control unit 14 sends an electrical control signal to the air dryer 6, which in turn controls the compressor relief. In this variant, the control unit 14 registers the electrical control signal in order to determine that the compressor is working.

Figure 6:
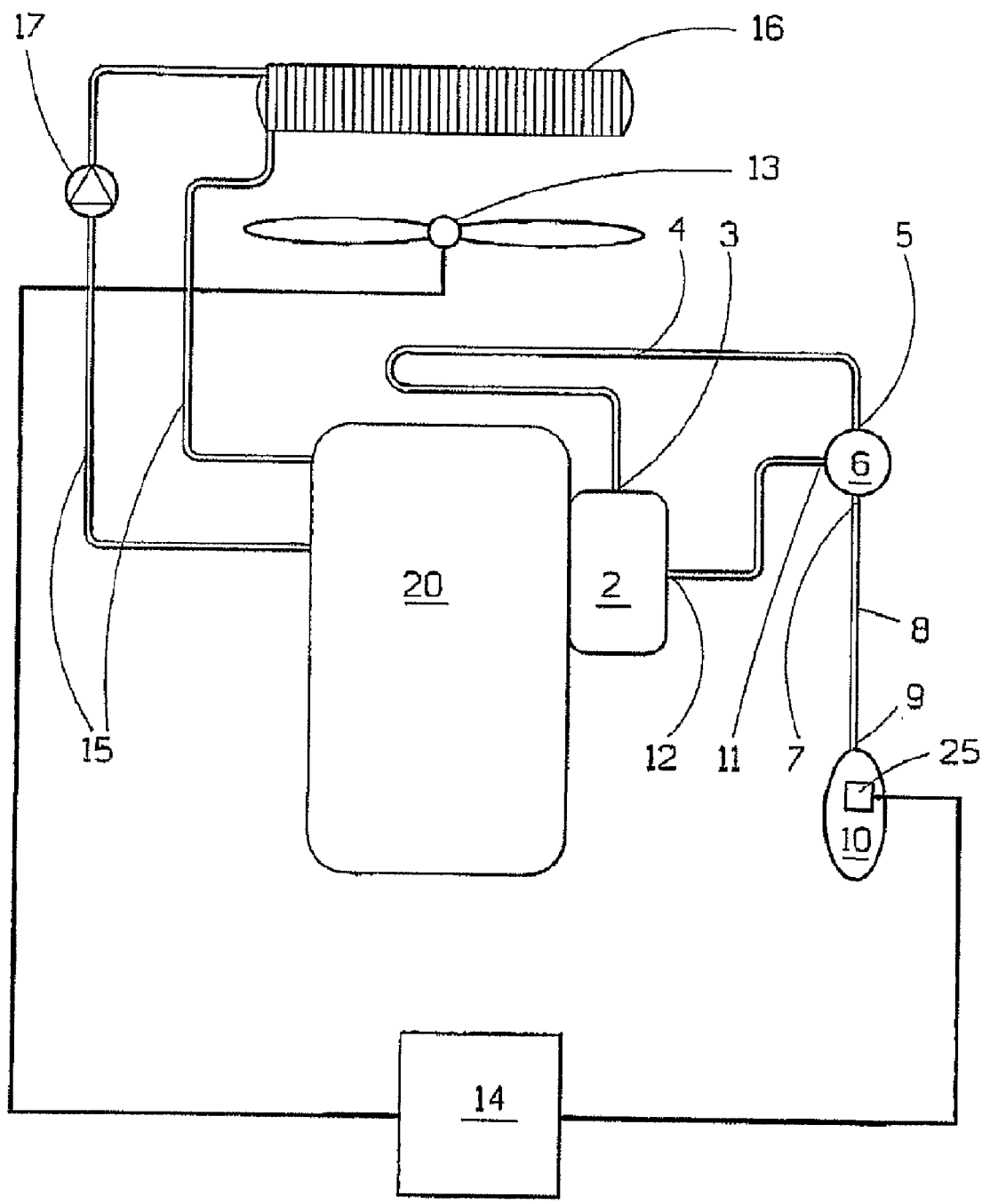
FIG. 6 shows a diagram of a system for cooling compressed air through fan control according to a fifth variant of the invention.

According to a fifth variant of the second embodiment of the invention, which is shown in FIG. 6, the control unit, without itself sending a control signal to the compressor, determines that the compressor is working in that a pressure sensor 25, which is fitted in connection with the pressurized tank, registers pressure and pressure changes in the pressurized tank 10. This is achieved in that the control unit determines that the compressor is working when the pressure sensor registers a pressure in the pressurized tank lower than a first limit. The control unit determines that the compressor is not working when the pressure sensor registers a pressure in the pressurized tank exceeding a second limit. The control unit determines that the compressor is working when the pressure sensor registers a pressure in the pressurized tank between the first and second limits and the sensor registers that the pressure is rising. The control unit determines that the compressor is not working when the pressure sensor registers a pressure in the pressurized tank between the first and second limits and the sensor registers that the pressure is falling or constant.

Furthermore, according to one embodiment of the invention, it is possible to determine the cooling requirement as a function of the ambient air temperature and the speed of the vehicle, should the compressed air supply system be fitted on a vehicle.

Figure 7:
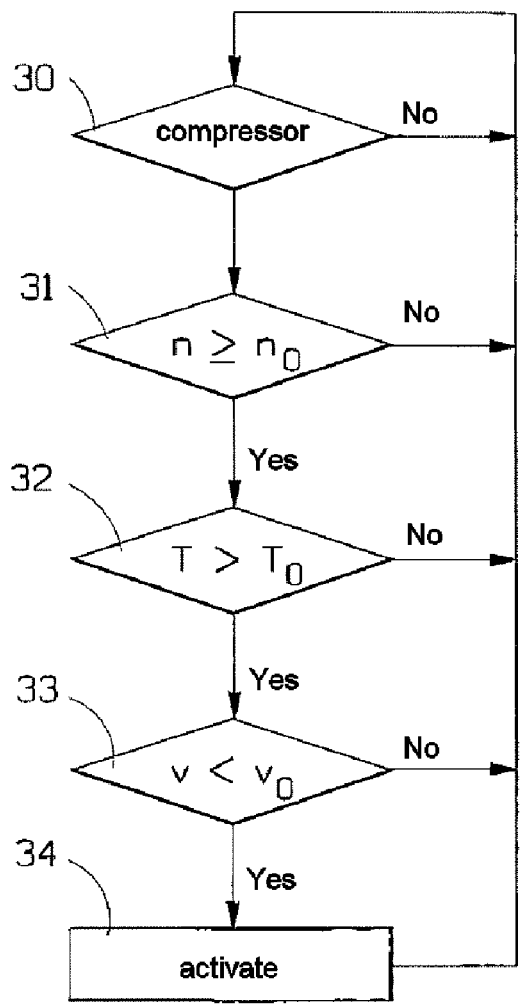
FIG. 7 shows a diagram of a method for establishing a cooling requirement.

FIG. 7 shows a diagram of the stages that, according to one embodiment of the invention, are involved in determining whether or not a cooling requirement exists. In a first stage 30 of the method, it is determined whether or not the compressor 2 is feeding air to the system. This can be determined according to any of the methods specified above. If the compressor is not working, there is no cooling requirement. In a second stage 31, it is decided whether the working speed of the compressor exceeds a certain limit. In one embodiment, in which the compressor is driven by an internal combustion engine, the working speed of the internal combustion engine is determined and there is deemed to be a potential cooling requirement if the working speed exceeds the idling speed of the internal combustion engine, which corresponds to a speed of approximately 700 rpm. In a third stage 32, it is decided whether the outdoor temperature exceeds a specific limit. A cooling requirement exists only if the outdoor temperature exceeds this limit. According to one embodiment, this limit is set at 0° C. In a fourth stage 33, it is decided whether a vehicle in which the pneumatic system is fitted is being propelled at a speed in excess of a limit. A cooling requirement exists only when the speed is less than this limit. According to one embodiment, the limit is set at 50 km/h. When the checks according to stages one to four have been performed and answered affirmatively, the control unit in a fifth stage 34 generates an activation signal for the electrically controlled fan.

Figure 8:
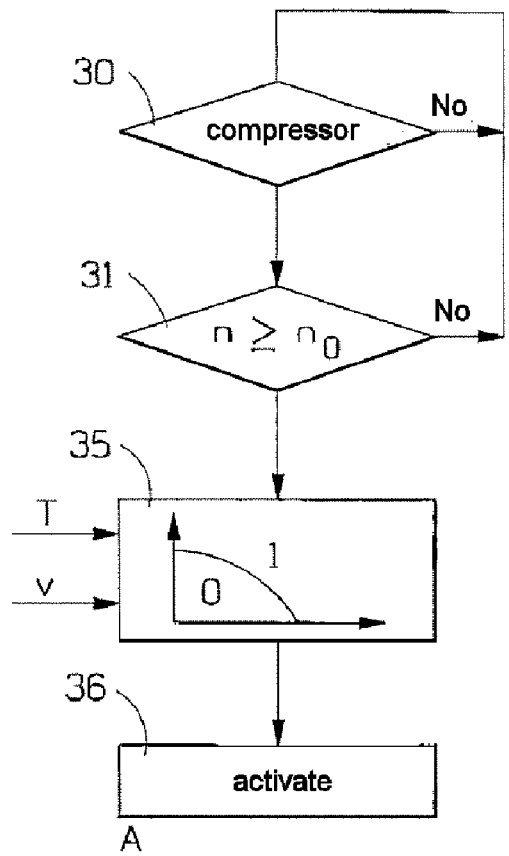
FIG. 8 shows a diagram of an alternative method for establishing a cooling requirement.

FIG. 8 shows an alternative embodiment for determining whether or not a cooling requirement exists. In a first stage 30 of the method, it is determined whether or not the compressor 2 is feeding air to the system. This can be determined according to any of the methods specified above. If the compressor is not working, there is no cooling requirement. In a second stage 31 it is decided whether the working speed of the compressor exceeds a certain limit. In one embodiment in which the compressor is driven by an internal combustion engine, the working speed of the internal combustion engine is determined and there is deemed to be a potential cooling requirement if the working speed exceeds the idling speed of the internal combustion engine, which corresponds to a speed of approximately 700 rpm. In a third stage 35, the parameters outdoor temperature T and vehicle speed are used as input data for a control function in the speed and outdoor temperature parameter space. Depending on the combination of these two values, an output signal is generated, which indicates whether or not a cooling requirement exists. In a fourth stage 26, the control unit 14 generates an activation signal for the adjustable fan if a cooling requirement exists.

Figure 9:
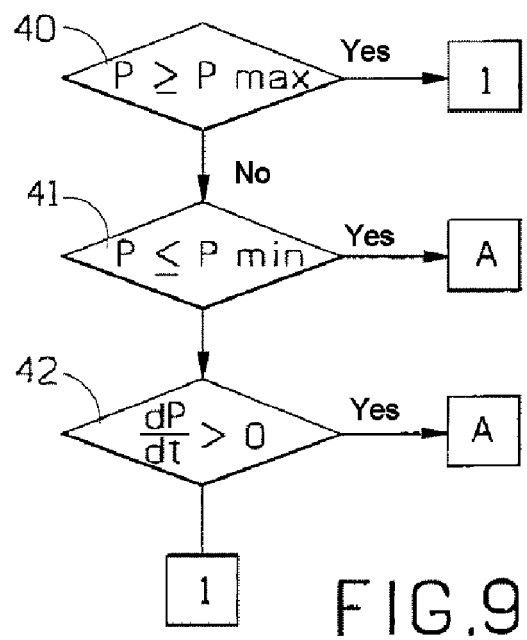
FIG. 9 shows a diagram of a method for establishing that a compressor in a pneumatic system is working.

FIG. 9 shows a diagram of a method of deciding whether or not the compressor 2 is being driven in an active condition in which the compressor is feeding air to a pressurized tank 10. In a first stage 40, it is decided whether the pressure in the pressurized tank exceeds a first limit $P_{max}$. If this is the case, the compressor is inactive. In a second stage 41, it is decided whether the pressure is less than a second limit $P_{min}$. If this is the case, the compressor is active. In a third stage 42 it is determined whether the pressure in the tank is rising. If this is the case, the compressor is active. Otherwise the compressor is inactive.

The invention also relates to a vehicle comprising an internal combustion engine 14, a cooling system 15, 16, 17 coupled to the internal combustion engine, an adjustable fan 13 controlled by a control unit 14 and a compressed air supply system 1. The compressed air supply system 1 comprises a compressor 2, a compressed air line 4, which connects an outlet 3 from the compressor 2 to an inlet 5 to a first active component 6, in which the adjustable fan 13 is arranged to generate an air flow intended to cool a radiator 16 forming part of the cooling system, and the compressed air line 4. The control unit 14 is arranged to determine a cooling requirement of the compressed air delivered by the compressor 2 and to generate an activation signal for the adjustable fan 13 when a cooling requirement exists, thereby protecting the first active component 6 against thermal overload resulting from compressed air fed in from the compressor.

In this case the vehicle engine 14 is preferably used as the power source both for the fan and the compressor. The fan 13 is preferably driven by the engine 14 by way of a variable transmission and the compressor 2 via a disengageable transmission. The fan is therefore used both in the cooling system of the internal combustion engine and in order to cool the compressed air line 4. The fan is in this case controlled by a logic system in which the unit that requires the greatest cooling determines the speed of the fan or determines whether the fan is to be switched on or off.

Where fitted on a vehicle, the compressed air supply system can have other characteristics than those specified above in the description of the general system. In particular, and among others, information on the speed of the vehicle may be used in order to determine whether or not the fan needs to be activated. This is done by activating the fan only if the speed of the vehicle is less than a specific limit.

The invention claimed is:

1. A compressed air supply system comprising: a pressured tank supplied with compressed air from a compressor, a compressed air line that connects an outlet from the pressured tank to an inlet of a first active component, and an adjustable fan that is controlled by a control unit and which is arranged to generate an air flow to cool the compressed air line; and the control unit is arranged to determine a cooling requirement of the compressed air delivered by the compressor and to generate an activation signal for the adjustable fan when a cooling requirement exists, thereby protecting said first active component against thermal overload resulting from compressed air fed in from the compressor.

2. A compressed air supply system comprising: a compressor, a compressed air line that connects an outlet from the compressor to an inlet of a first active component, and an adjustable fan that is controlled by a control unit and which is arranged to generate an air flow to cool the compressed air line; and the control unit is arranged to determine a cooling requirement of the compressed air delivered by the compressor and to generate an activation signal for the adjustable fan when a cooling requirement exists, thereby protecting said first active component against thermal overload resulting from compressed air fed in from the compressor and wherein the control unit is arranged to determine that a cooling requirement exists if the compressor is active and the working speed of the compressor exceeds a specific limit.

3. The compressed air supply system as recited in claim 2, wherein the control unit is arranged to determine that a cooling requirement exists if the ambient air temperature exceeds a specific limit.

4. The compressed air supply system as recited in claim 2, further comprising: a pressurized tank and the compressor being arranged to assume an active state when the compressor feeds air to the pressurized tank and a passive state when the compressor is not feeding air to the pressurized tank, the compressor is arranged to assume one of these states as a function of an air supply requirement under the influence of a control signal, and the control unit is arranged to determine that the compressor is active by registering the control signal.

5. The compressed air supply system as recited in claim 4, wherein the control signal is pneumatic and is registered by the control unit through a pressure sensor.

6. The compressed air supply system as recited in claim 4, wherein the control signal is electrical and is registered and generated by the control unit.

7. The compressed air supply system as recited claim 2, further comprising: a pressurized tank arranged to store compressed air fed in by the compressor; the compressor being arranged to assume an active state when the compressor feeds air to the pressurized tank and a passive state when the compressor is not feeding air to the pressurized tank, the compressor being arranged to assume one of these states as a function of an air supply requirement; and a pressure sensor arranged in the pressurized tank and the control unit arranged to determine that the compressor is active based on the pressure registered by the pressure sensor and from the change in pressure in the pressurized tank.

8. The compressed air supply system as recited in claim 7, wherein the control unit is arranged to determine that the compressor is active when the pressure sensor registers a pressure in the pressurized tank lower than a first limit.

9. The compressed air supply system as recited in claim 7, wherein the control unit is arranged to determine that the compressor is inactive when the pressure sensor registers a pressure in the pressurized tank exceeding a second limit.

10. The compressed air supply system as recited in claim 9, wherein the control unit is arranged to determine that the compressor is active when the pressure sensor registers a pressure in the pressurized tank between the first and second limits and the sensor registers the fact that the pressure is rising and that the control unit is arranged to determine that the compressor is inactive when the pressure sensor registers a pressure in the pressurized tank or pressurized tanks between the first and second limits and that the sensor registers the fact that the pressure is falling or constant.

11. A compressed air supply system comprising: a pressured tank supplied with compressed air from a compressor, a compressed air line that connects an outlet from the pressured tank to an inlet of a first active component, and an adjustable fan that is controlled by a control unit and which is arranged to generate an air flow to cool the compressed air line; and the control unit is arranged to determine a cooling requirement of the compressed air delivered by the compressor and to generate an activation signal for the adjustable fan when a cooling requirement exists, thereby protecting said first active component against thermal overload resulting from compressed air fed in from the compressor and wherein a temperature probe is arranged to measure the temperature of the compressed air delivered by the compressor and the control unit is arranged to determine that a cooling requirement exists if the temperature of the compressed air delivered by the compressor exceeds a specific limit.

12. A vehicle comprising: an internal combustion engine; a cooling system coupled to the internal combustion engine; an adjustable fan controlled by a control unit; a compressed air supply system comprising a pressured tank supplied with compressed air from compressor, a compressed air line that connects an outlet from the pressured tank to an inlet to a first active component, the adjustable fan being arranged to generate an air flow intended to cool a radiator forming part of the cooling system and the compressed air line; and the control unit is arranged to determine a cooling requirement of the compressed air delivered by the compressor and to generate an activation signal for the adjustable fan when a cooling requirement exists, thereby protecting the first active component against thermal overload resulting from compressed air fed in from the compressor.

13. A vehicle comprising: an internal combustion engine; a cooling system coupled to the internal combustion engine; an adjustable fan controlled by a control unit; a compressed air supply system comprising a compressor, a compressed air line that connects an outlet from the compressor to an inlet to a first active component, the adjustable fan being arranged to generate an air flow intended to cool a radiator forming part of the cooling system and the compressed air line; and the control unit is arranged to determine a cooling requirement of the compressed air delivered by the compressor and to generate an activation signal for the adjustable fan when a cooling requirement exists, thereby protecting the first active component against thermal overload resulting from compressed air fed in from the compressor and wherein the compressed air supply system further comprises: a pressurized tank; and the compressor is arranged to assume an active state when the compressor feeds air to the pressurized tank and a passive state when the compressor is not feeding air to the pressurized tank, the compressor being arranged to assume one of these states as a function of an air supply requirement; and the control unit being arranged to determine that the compressed air delivered by the compressor has a cooling requirement when the compressor is activated and the engine speed of the internal combustion engine exceeds a specific limit.

14. The vehicle as recited in claim 13, wherein the compressed air supply system further comprises: the pressurized tank and the compressor is arranged to assume an active state when the compressor feeds air to the pressurized tank and a passive state when the compressor is not feeding air to the pressurized tank and the compressor is arranged to assume one of these states as a function of an air supply requirement; and the control unit being arranged to determine that the compressed air delivered by the compressor has a cooling requirement when the compressor is activated and the speed of the vehicle is less than a specific limit.

15. The vehicle as recited in claim 13, further comprising: the pressurized tank and the compressor is arranged to assume an active state when the compressor feeds air to the pressurized tank and a passive state when the compressor is not feeding air to the pressurized tank and the compressor is arranged to assume one of these states as a function of an air supply requirement; and the control unit being arranged to determine that the compressed air delivered by the compressor has a cooling requirement when the compressor is activated and the outdoor temperature exceeds a specific limit.

* * * * *